Aug. 8, 1944.  J. W. TEKER  2,355,484
BRAKE SYSTEM
Filed April 16, 1943
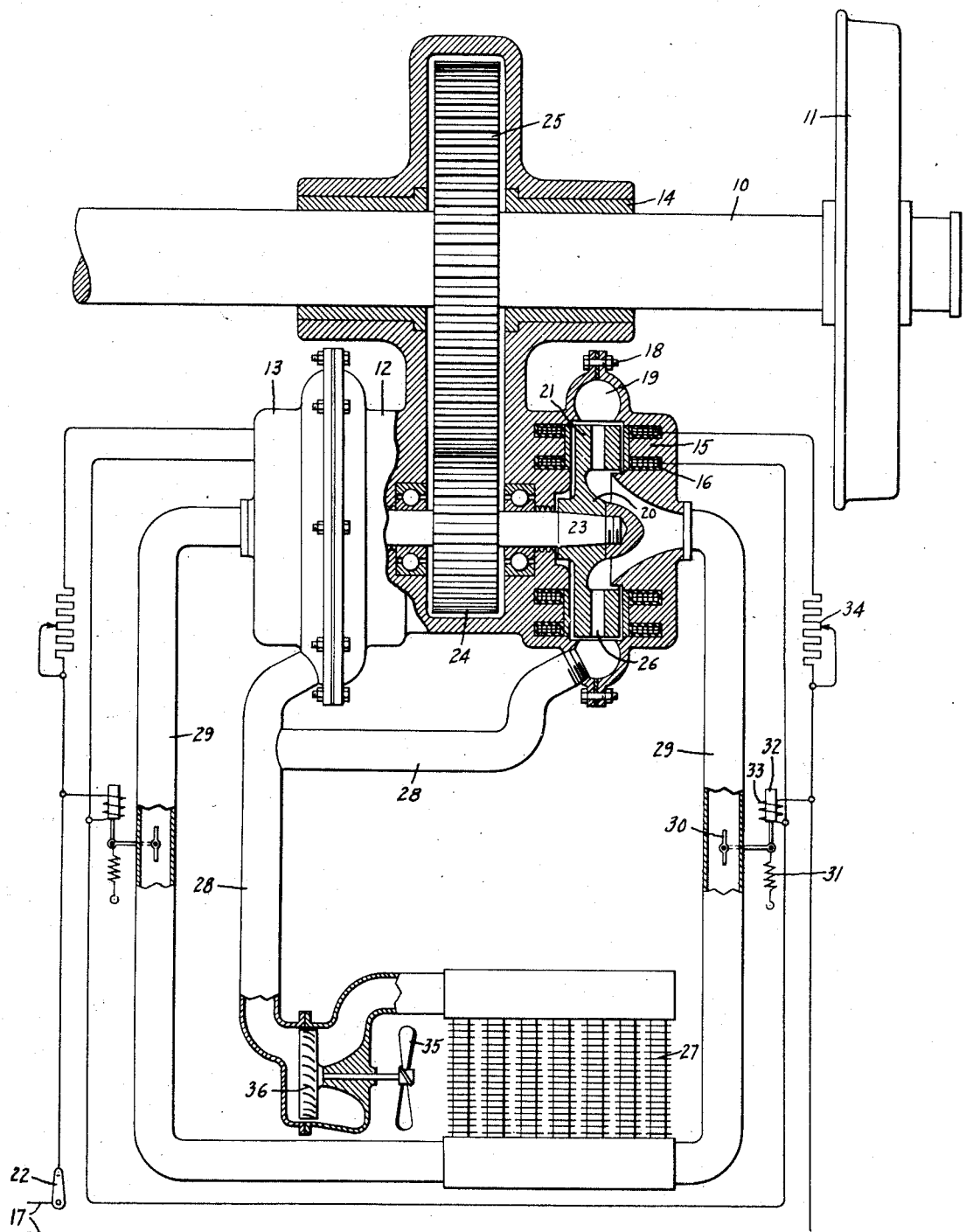
Inventor:
John W. Teker,
by Harry E. Dunham
His Attorney.

Patented Aug. 8, 1944

2,355,484

UNITED STATES PATENT OFFICE 2,355,484

BRAKE SYSTEM

John W. Teker, Wesleyville, Pa., assignor to General Electric Company, a corporation of New York Application April 16, 1943, Serial No. 483,259

4 Claims. (Cl. 188—104)

My invention relates to brake systems and more particularly to electrically operated brakes for vehicles.

An object of my invention is to provide an improved brake system.

Another object of my invention is to provide an improved brake system utilizing an electrically operated inductor type brake in which the rotatable member is formed as a cooling fluid impeller for circulating cooling fluid through a heat exchanger to dissipate the braking energy developed by the brake.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing is a partial sectional view illustrating a brake system provided with an embodiment of my invention.

Referring to the drawing, I have shown my invention applied to a railway vehicle axle 10 adapted to be supported by wheels 11. The brake system includes an electrically operated brake provided with a stationary member formed of a pair of axially spaced apart frames 12 and 13 mounted by bearings 14 on the axle 10, which is rotatable relative thereto. In the illustrated arrangement, a pair of similar brakes are mounted on the axle to provide the desired braking force with a minimum diameter for the equipment. The frames 12 and 13 are formed of magnetic material and each is provided with a plurality of pole pieces 15 arranged in circumferentially spaced apart relationship and adapted to be excited by an exciting winding 16 arranged to be energized by any suitable source of electrical power supply 17. These frames 12 and 13 are secured together in any suitable manner, as by a plurality of bolts 18 and are formed to provide a cooling fluid housing 19 about a centrally arranged rotatable brake member 20. The rotatable member 20 of the brake is formed of magnetic material and is provided with an annular outer rim 21 having substantially flat side faces adjacent the pole pieces 15 in which electric currents are adapted to be induced. The rotatable induction member 20 may be of any suitable type in which currents are induced and flow through the effectively short-circuited electrically conductive portion of this member adjacent the pole pieces 15. In the illustrated construction, this current carrying portion is a unitary element, although any other suitable current carrying short-circuited member may be used. This provides an electrically inductive member in which a braking torque is developed by electric currents when the exciting winding 16 is energized by being connected to a source of electrical power supply 17 through a switch 22. The rotatable members 20 of the brakes are mounted on a shaft 23 on opposite sides of a gear 24 which is arranged in engagement with a driving gear 25 secured to the car axle 10. A suitable seal is provided about the shaft 23 between the gear box about the gears 24 and 25 and the cooling fluid housing 19 to prevent mixture of the cooling fluid and lubricant in the gear casing. Each rotatable brake member is formed as a fluid impeller with outwardly extending passages 26 therein which expel fluid outwardly of the rotatable member under the action of centrifugal force when the rotatable member is in operation. If the rotatable member is provided with a radial conductor winding, the conductors can be made of tubular elements through which cooling fluid can be passed to cool the winding and the rotatable member. In order to provide for dissipation of the braking energy which generates heat in the rotatable member rim 21, the braking system includes a circulating cooling fluid circuit. This cooling fluid circuit is provided with a heat exchanger 27 which is connected by cooling fluid conduits 28 and 29 to the exhaust and intake sides of the brake such that operation of the rotatable member is adapted to circulate cooling fluid through the heat exchanger 27. This operation of the rotatable member 20 would tend to impose a braking action on the car axle 10 even if the exciting windings 16 were not energized. In order to prevent this undesirable action, valves 30 are arranged in the conduits 29 to prevent circulation of cooling fluid when the brake winding 16 is not energized. These valves 30 are adapted to be biased to a closed position by a suitable biasing element such as a spring 31 and to be operated to an open position as shown in the drawing by an electromagnetically controlled armature 32 and coil 33. The coil 33 for each valve 30 is connected to be energized such that the armature 32 is actuated to the open valve position when the brake exciting winding 16 is energized, and the valve 30 is operated to its closed position by the spring 31 when the brake exciting winding 16 is deenergized. In the illustrated system, this is obtained by connecting the coils 33 in shunt across the brake windings 16 and control resistors 34 in series with the windings 16, although the energization of these coils might be obtained by a suitable series or separate source of energization if desired. This arrangement permits circulation of cooling fluid through the heat exchanger and the brake rotatable member and responds to energization of the brake exciting winding and closes off circulation of cooling fluid through the heat exchanger and the brake rotatable member on deenergization of the brake exciting winding, thus minimizing any possible load of the brake on the car axle 10 when the brake exciting windings 16 are deenergized. The braking torque is controllable by the resistors 34 by varying the energization of the windings 16 and, therefore, the excitation of the brakes. In order to increase the efficiency of the system, a ventilating medium impeller 35 is arranged to circulate ventilating medium through the heat exchanger 27 to dissipate the heat of the cooling fluid therein, and this impeller 35 is provided with an actuating member 36 of any suitable form. In the drawing, this actuating member is formed as a fluid turbine arranged to be operated by circulation of cooling fluid through the cooling fluid circuit. This construction provides for a compact and efficient electrically operated brake system having a relatively simple control circuit which can be combined with an air-brake system to reduce brake shoe and car wheel wear.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A brake system including an electrically operated brake having a relatively stationary member with an exciting winding and a rotatable electrically inductive member formed as a fluid impeller for circulating cooling fluid through said brake, means for driving said brake rotatable member, and means including a heat exchanger connected to said brake having a ventilating medium impeller adapted to be actuated by circulation of cooling fluid by said brake rotatable member for circulating ventilating medium through said heat exchanger for cooling the cooling fluid circulated by said brake rotatable member.

2. A brake system including an electrically operated brake having a relatively stationary member with an exciting winding and adapted to contain cooling fluid and a rotatable electrically inductive member for providing a braking torque and formed as a fluid impeller for circulating cooling fluid through said brake, and means including a heat exchanger connected to said brake having a ventilating medium impeller arranged to be operated in response to circulation of cooling fluid by said brake rotatable member through said heat exchanger for circulating ventilating medium through said heat exchanger for cooling the cooling fluid.

3. A brake system including an electrically operated brake having a relatively stationary exciting member with an exciting winding and a rotatable inductor member formed as a fluid impeller, means including a heat exchanger connected in a fluid circulating circuit with said rotatable member for cooling a fluid impelled therethrough by said rotatable member, means responsive to energization of said brake exciting winding for permitting circulation of fluid through said heat exchanger and said brake rotatable member and for closing off circulation of fluid through said heat exchanger and said brake rotatable member on deenergization of said brake exciting winding, and means including a ventilating medium impeller adapted to be operated in response to circulation of cooling fluid by said brake rotatable member for circulating ventilating medium through said heat exchanger to dissipate heat generated in said brake rotatable member and transferred to the cooling fluid.

4. A brake system including an electrically operated brake having a relatively stationary exciting member with an exciting winding and a rotatable inductor member formed as a fluid impeller, means for driving said rotatable brake member, means including a heat exchanger connected in a fluid circulating circuit with said rotatable member for cooling a fluid impelled therethrough by said rotatable member, means including a valve operated in response to energization of said brake exciting winding for permitting circulation of fluid through said heat exchanger and said brake rotatable member and for closing off circulation of fluid through said heat exchanger and said brake rotatable member on deenergization of said brake exciting winding, and means including a ventilating medium impeller having an actuating member arranged to be operated by circulation of fluid through said heat exchanger for circulating ventilating medium through said heat exchanger to dissipate heat generated in said brake rotatable member and transferred to the cooling fluid.

JOHN W. TEKER.